United States Patent [19]

Kirkland et al.

[11] Patent Number: 4,892,589

[45] Date of Patent: Jan. 9, 1990

[54] COMPOSITION COMPRISING WATER-SOLUBLE, NONIONIC HYDROPHOBICALLY MODIFIED HYDROXYETHYL CELLULOSE AND WATER-SOLUBLE, NONIONIC HYDROXYETHYL CELLULOSE

[75] Inventors: William J. Kirkland, Newark, Del.; Carl A. Lukach, Katy, Tex.; William C. McLachlan, West Chester, Pa.

[73] Assignee: Aqualon Company, Wilmington, Del.

[21] Appl. No.: 232,820

[22] Filed: Aug. 16, 1988

Related U.S. Application Data

[62] Division of Ser. No. 115,214, Oct. 30, 1987, Pat. No. 4,784,693.

[51] Int. Cl.$^4$ ............................................. C04B 24/10
[52] U.S. Cl. .................... 106/197.1; 106/314; 106/93; 526/200; 526/201; 526/202; 536/90; 536/91
[58] Field of Search ............... 526/200, 201, 202; 536/90, 91; 106/314, 197.1, 93

[56] References Cited

U.S. PATENT DOCUMENTS

| T976,002 | 11/1987 | Vanderslice . | |
| 3,378,070 | 4/1968 | Wessler et al. | 166/22 |
| 3,483,007 | 12/1969 | Hook | 106/93 |
| 3,528,832 | 9/1970 | Ericsson et al. | 106/93 |
| 3,959,003 | 5/1976 | Ostroot et al. | 106/93 |
| 4,228,277 | 10/1980 | Landoll | 536/90 |
| 4,243,802 | 1/1981 | Landoll . | |
| 4,352,916 | 10/1982 | Landoll | 526/200 |
| 4,433,731 | 2/1984 | Chatterji et al. | 166/293 |
| 4,462,836 | 7/1984 | Baker et al. | 166/293 |
| 4,462,837 | 7/1984 | Baker et al. | 166/293 |
| 4,470,463 | 9/1984 | Holland | 166/293 |
| 4,485,089 | 11/1984 | Leipold . | |
| 4,515,635 | 5/1985 | Rao et al. | 106/90 |
| 4,529,523 | 7/1985 | Landoll | 166/275 |
| 4,654,085 | 3/1987 | Schinski | 106/93 |
| 4,662,943 | 5/1987 | Baker et al. | 106/93 |
| 4,684,704 | 8/1987 | Craig . | |
| 4,707,187 | 11/1987 | Tsuda et al. | 166/293 |
| 4,707,188 | 11/1987 | Tsuda et al. | 106/293 |

FOREIGN PATENT DOCUMENTS

| 140486 | 5/1985 | European Pat. Off. . |
| 177303 | 4/1986 | European Pat. Off. . |
| 85/01935 | 5/1985 | PCT Int'l Appl. . |
| 777360 | 12/1977 | South Africa . |
| 2146320 | 4/1985 | United Kingdom . |

Primary Examiner—Mark L. Bell
Assistant Examiner—Karl Group
Attorney, Agent, or Firm—Mark D. Kuller

[57] ABSTRACT

A novel cementing composition comprising a hydraulic cement and, as a fluid loss agent, water-soluble, nonionic hydrophobically modified hydroxyethyl cellulose, are disclosed. Preferably, the cementing composition further comprises water-soluble, nonionic hydroxyethyl cellulose as a second fluid loss agent. A novel aqueous slurry containing the cementing composition, a novel process of using the aqueous slurry to fill an annulus between a borehole wall and casing, and a novel composition of matter comprising specified amounts of water-soluble, nonionic hydrophobically modified hydroxyethyl cellulose and water-soluble, nonionic hydroxyethyl cellulose, are also disclosed.

20 Claims, No Drawings

COMPOSITION COMPRISING WATER-SOLUBLE, NONIONIC HYDROPHOBICALLY MODIFIED HYDROXYETHYL CELLULOSE AND WATER-SOLUBLE, NONIONIC HYDROXYETHYL CELLULOSE

This is a division of 115,214 filed 10/30/87, now U.S. Pat. No. 4,784,693.

This invention is directed to a novel cementing composition, a novel aqueous hydraulic cement slurry, and a novel process of using the same, as well as a novel composition useful as a fluid loss additive in all the above. Specifically, this invention is directed to a cementing composition and an aqueous hydraulic cement slurry containing, as a fluid loss control additive, water-soluble, nonionic hydrophobically modified hydroxyethyl cellulose (HMHEC) alone or with water-soluble, nonionic hydroxyethyl cellulose (HEC). In addition, this invention is directed to a novel composition comprising HMHEC and HEC.

BACKGROUND OF THE INVENTION

Hydraulic cements, i.e., inorganic cements that harden or set under the influence of water, are frequently used in cementing operations associated with oil, gas, water and brine wells, as well as dam and tunnel construction. For instance, aqueous hydraulic cement slurries are used, during or after the completion of the drilling of an oil or gas well, to fill the annulus between the borehole wall and the outside of the casing. Usually, such wells are cemented by pumping a cement slurry downwardly though the casing with a shoe and/or float valve and then upwardly into the annulus surrounding the casing. The cement (a) provides a sheath surrounding the casing that prevents or inhibits communication between the various formations penetrated by the well, (b) aids in bonding and supporting the casing, (c) protects the casing from corrosion, (d) prevents blowouts by quickly forming a seal, (e) protects the casing from shock loads in drilling deeper, and (f) aids in sealing off zones of lost circulation.

Hydraulic cements manufactured for use in oil and gas wells are subject to wide ranges of temperature and pressure when in position in a well and differ considerably from cements used at atmospheric conditions. As a result, specifications covering eight classes of oil well cements, designated Classes A, B, C, D, E, F, G and H, are provided by the American Petroleum Institute (API). These cements comprise portland cement and a variety of cementing additives, such as those discussed below. Portland cement used in the cements classified by API are primarily comprised of about 40 to about 60% tricalcium silicate, about 15 to about 30% B-dicalcium silicate, about 8 to about 12% tetracalcium aluminoferrite and about 3 to about 8% tricalcium aluminate, with the total of tricalcium silicate and dicalcium silicate generally being about 75 to about 80% (Free CaO and MgO are generally held below about 1.5% and about 5%, respectively). Other hydraulic cements used in such wells are aluminous or pozzolanic cements. Cements and cementing are described by D. K. Smith in *Cementing*, American Institute of Mining, Metallurgical, and Petroleum Engineers, Inc. (1976).

In many uses of hydraulic cements, it is necessary for an aqueous cement slurry to be emplaced within or next to a porous medium, for example, earthen strata in the cementing of oil and drilling wells. When such is the case, water filters out of the slurry and into the strata during the setting period. When this occurs to an appreciable extent there usually results an uncontrolled setting rate, improper placement, impaired strength properties and contamination of the surrounding strata. The loss of fluids into the surrounding strata may be controlled by incorporation of fluid loss control additives or agents into the hydraulic cement. Fluid loss control additives for use in such cements include copolymers of N,N, dimethylacrylamide and 2-acrylamide, 2-methyl propane sulfonic acid as described by Rao et al in U.S. Pat. No. 4,515,635, modified alkylenediamine or polyalkylenepolyamine compositions as described by Willis et al in PCT International Publication No. WO 85/01935, and polysacharides such as HEC as described by Hook in U.S. Pat. No. 3,483,007.

Use of synthetic polymers as fluid loss agents is expensive. Therefore, there has been a desire to use less expensive natural polymers such as HEC. Although HEC provides good fluid loss, there is still a desire to reduce costs by replacing HEC with a more efficient and less expensive fluid loss additive, which does not adversely effect the rheological characteristics of the cementing composition or slurry.

SUMMARY OF THE INVENTION

This invention is directed to a cementing composition, which can be mixed with water to form an aqueous hydraulic cement slurry useful in, among other things, drilling operations, containing a hydraulic cement and, as a fluid loss control additive, water-soluble, nonionic hydrophobically modified hydroxyethyl cellulose (HMHEC). In a preferred embodiment both HMHEC and water-soluble, nonionic hydroxyethyl cellulose (HEC) are used as fluid loss control additives. This invention is also directed to the aqueous hydraulic cement slurry and to a process of using the aqueous slurry to fill the annulus between a borehole wall and a casing. In another aspect, this invention is directed to a composition comprising HMHEC and HEC which may be used, among other things, as a fluid loss agent for oil well casing cements.

DETAILED DESCRIPTION OF THE INVENTION

The polymers useful in this invention are well known water-soluble polymers Water-soluble, nonionic hydroxyethyl cellulose (HEC) is available commercially or can be prepared by known methods, such as by treating a cellulose furnish with ethylene oxide in an alkaline medium. Any cellulose furnish can be used, such as wood pulp or chemical cotton. Typically the cellulosic furnish has a degree of polymerization (D.P.) of from about 300 to about 2300.

The water-soluble, nonionic hydrophobically modified hydroxyethyl cellulose (HMHEC) of this invention may be prepared from HEC by chemically incorporating a long chain n-alkyl radical having 6 to 25, preferably 8 to 18 carbon atoms (hydrophobe), onto the HEC. The hydrophobe is attached to the cellulose via an ether or ester linkage, preferably an ether linkage. The amount of hydrophobe incorporated can vary from about 0.2 to about 4%, preferably about 0.2 to about 1.5%, most preferably 0.2 to 1.0%, based on the weight of the fully substituted polymer. The HMHEC of this invention has a hydroxyethyl molar substitution (M.S.) of at least about 1.5, preferably about 1.5 to about 4.0

(i.e., about 1.5 to about 4.0 moles of hydroxyethyl substitution per average anhydroglucose unit), and a relatively low to medium molecular weight (e.g., having a Brookfield viscosity in a 1% aqueous solution of about 300 to 500 cps at ambient temperature). The composition and preparation of the water-soluble HMHEC useful in this invention is described by Landoll in U.S. Pat. Nos. 4,228,227 and 4,352,916.

The HEC useful in combination with HMHEC per this invention has a hydroxyethyl M.S. of at least about 0.5, preferably about 1.0 to about 2.5, and most preferably 1.5 to 2.5 and relatively low to medium molecular weight (e.g., having a Brookfield viscosity of 25 to 250 cps in a 5% aqueous solution at ambient temperature).

Factors which affect cement slurry design include the type of cement and additives to be used, well temperature, mud-column pressure, viscosity and water content of cement slurries, pumping or thickening time, strength of cement required to support the pipe, quality of available water, slurry density, heat of hydration, permeability of set cement, filtration control, and resistance to down-hole brines. The HMHEC and HMHEC/HEC blends of this invention can be used under essentially the same conditions as HEC. Notably, excellent fluid loss properties, superior to those obtained with HEC, are obtained in shallow, intermediate and deep wells, but especially in intermediate depth wells at temperatures of from about 140° F. to about 225° F. A general description of the cementing composition and slurry follows.

The cementing composition of this invention may contain any of the known hydraulic cements, and, preferably, contains a portland cement based hydraulic cement such as API types A through H. The fluid loss additive or additives, i.e., the HMHEC or HMHEC and HEC, are contained in an amount of about 0.1 to about 2.0%, preferably from about 0.3 to about 0.5%, based on the total dry weight of the hydraulic cement.

The cementing composition is useful in all types of water generally encountered in drilling operations, i.e., fresh and tap water, natural and synthetic sea water, and natural and synthetic brine. The most commonly used sources of water are fresh water from rivers, lakes and streams when drilling on land and sea water when drilling in the ocean. The aqueous hydraulic drilling cement slurry of this invention generally contains about 40 to about 100% water, based on the dry weight of the hydraulic cement.

The hydraulic cement and fluid loss agent(s) may be dry blended to form a cementing composition and then added to water, or may be added directly to water. Similarly, when used in combination, the HEC and HMHEC may be dry blended prior to addition to the cementing composition or aqueous hydraulic cement slurry, or they may be added to the cementing composition or aqueous hydraulic cement slurry individually. In either event, when HEC and HMHEC are used in combination, they are contained such that each is present in an amount of 1 to 99%, preferably about 15 to about 85%, most preferably about 30 to about 70%, based on the total weight of the HEC and HMHEC.

Other polysaccharides and synthetic polymers may be used in combination with HMHEC or HMHEC and HEC in this invention. Exemplary are carboxymethyl cellulose, hydroxypropyl cellulose, methyl cellulose, methyl hydroxyethyl cellulose, carboxymethyl hydroxyethyl cellulose (CMHEC), hydroxypropyl methyl cellulose, ethyl hydroxyethyl cellulose, guar, hydroxypropyl guar, carboxymethyl guar, xanthan and acrylamide copolymers. They may be added to modify, among other things, rheological or fluid loss properties.

Other additives commonly employed in oil well casing cements can also be used in this invention. They include (a) cement accelerators such as calcium chloride, sodium chloride and sodium silicate, (b) lightweight additives (used to reduce the weight of the slurry) such as bentonite, diatomaceous earth, natural hydrocarbons such as gilsonite and coal, expanded perlite, nitrogen, fly ash and sodium silicate, (c) heavy weight additives such as hematite, ilmenite (iron-titanium oxide), barite, sand and salt, (d) cement retarders such as lignins (salts of lignosulfonic acid), gums, starches, weak organic acids, and cellulose derivatives such as CMHEC, (e) loss circulation control additives such as gilsonite, perlite, walnut shells, coal, cellophane and nylon, (f) cement dispersants or friction reducers including polymers, fluid-loss agents and salt (NaCl), (g) mud decontaminants such as paraformaldenyde and sodium chromate, (h) silica flour, (i) radioactive tracers, (j) indicator dyes, (k) hydrazine, (l) synthetic fibrous materials and (m) gypsum as described in, e.g., D. K. Smith, Cementing, cited above.

This invention is illustrated in the following example, which is not intended to be limiting. Therein, all parts, percentages, etc., are by weight unless otherwise indicated.

EXAMPLE

The polymers used in the example are summarized in the following Table 1.

TABLE 1

| Polymer | H.E.M.S.[1] | Polymers Hydrophobe Length | Amount[2] | Viscosity (cps) |
|---------|-------------|---------|---------|-----------|
| HEC 1   | 2.5   | —      | —      | 55[3]  |
| HEC 2   | 2.8   | —      | —      | 90[3]  |
| HEC 3   | 2.5   | —      | —      | 98[3]  |
| HEC 4   | 2.5   | —      | —      | 76[3]  |
| HMHEC 1 | 3.13  | C-16[4] | 0.56[5] | 440[6] |
| HMHEC 2 | 3.29  | C-16[4] | 0.65[5] | 360[6] |

[1] Hydroxyethyl molar substitution.
[2] Percentage by weight, based on the total weight of the HMHEC.
[3] Brookfield viscosity measured in a 5% aqueous solution at ambient temperature.
[4] 16 carbon atom n-alkyl radical.
[5] Weight % as $C_{16}$ (cetyl), based on the weight of the total polymer.
[6] Brookfield viscosity measured in a 1% aqueous solution at ambient temperature.

Testing was carried out according to American Petroleum Institute (API), "API Specification for Materials and Testing for Well Cements", API Spec 10, 1 st Edition, January 1982, except that filter paper was used on the screens for the fluid loss test.

Materials

The following components were used in the cements of the examples:

1. API Class H cement consisting of:
   Composition:
   | 50% tricalcium silicate | (3 CaO.SiO$_2$) |
   |---|---|
   | 30% dicalcium silicate | (2 CaO.SiO$_2$) |
   | 5% tricalcium aluminate | (3 CaO.Al$_2$O$_3$) |
   | 12% tetracalcium aluminoferrite | (4 CaO.Al$_2$Fe$_2$O$_3$) |

Characteristics:
   | Specific gravity (average) | 3.15 gm/cm |
   |---|---|
   | Surface area (range) | 1400 to 1700 cm$^2$/g |
   | Bulk volume | 1.06 × 10$^{-2}$ ft$^3$/lb |
   | Absolute volume | 3.81 × 10$^{-2}$ gal/lb |

-continued

2. Water - distilled.
3. Lomar D condensed sodium naphthalene sulfonate powder (sold by Diamond Shamrock) having the following characteristics:
   Apparent density            42/lbs/ft$^3$
   pH (10% solution at 75° C.) 9.3
   Activity (amount of active agent) 84%
   Impurities:
   Na$_2$SO$_4$                11%
   Moisture                    5%
4. Water Soluble Polymers: shown in Table 1 above.

Equipment

| | Equipment | |
|---|---|---|
| 1. | N. L. Baroid 387 Filter Press (Baroid Filter Press). | |
| | Operating pressure | 0 to 2,500 psig |
| | Operating temperature | 0 to 350° F. |
| | Cell volume | 175 ml |
| | Power consumption (heating chamber) | 400 watts (115 v Ac) |
| | Materials of construction | stainless steel |
| | Screens | 325 mesh on 60 mesh support |
| | Filter paper (on screens) | Baroid Catalog No. 988 |
| 2. | Chandler High Temperature, High Pressure Consistometer Model No. 7-1-15 (Chandler Consistometer). | |
| | Operating pressure | 0 to 25,000 psig |
| | Operating temperature | 0 to 400° F. |
| | Power consumption (heating chamber) | 4000 watts (240 v Ac) |
| 3. | Chandler Engineering Constant Speed Mixer Model No. 30060-5 (Chandler Mixer). | |

Slurry Preparation Procedure

A premixed dry blend of cement, polymer and Lomar D was added to the appropriate amount of distilled water (42%, based on the weight of the cement) stirred at 4,000 rpm over a period of 15 seconds in the Chandler Mixer. The resultant slurry was then shear blended in the Chandler Mixer at 12,000 rpm for 35 seconds.

Fluid Loss Test

While paddling, a slurry prepared according to the aforementioned procedures was poured into a pre-lubricated (silicon spray) consistometer cup until the material reached the fill line. Then, a potentiometer was placed on top of the cup and the cup was placed in the Chandler Consistometer. Heating was carried out according to the API temperature ramp schedule at 2° F per minute, with temperature measurements being taken every 2 minutes.

After the consistometer was heated to the final test temperature, the heated slurry was poured into a preheated fluid cell of the Baroid Filter Press (containing filter paper on screens) with paddling. Pressure lines were attached to the cell, and the upper and lower cell valves were opened to start the fluid loss test. Filtrate was collected in a graduate, with the filtrate level being recorded at 30 seconds, and 1, 2, 5, 10, 15, 20, 25 and 30 minutes. Whenever a sudden surge of pressure began blowing out the lower stem valve, the test was stopped and this was recorded as the time of dehydration. Otherwise the test was allowed to proceed for 30 minutes.

The final fluid loss value was calculated using the following equation:

$$Q_+ = Q_t \times 10.954 / \sqrt{t}$$

where: $Q_{30}$=Quantity of filtrate in 30 minutes (reported as final fluid loss).
$Q_t$=Quantity of filtrate at time t.
t=Time in minutes when test ended (This value will be 30 minutes unless dehydration occurs, in which case it is the time of dehydration.).

Thickening Time Test

A slurry, prepared according to the above procedures, was poured into a pre-lubricated (silicon grease) cup and the cup was sealed, ensuring that there were no air pockets. The apparatus (Chandler Consistometer) was set up, with pressure and temperature slope being selected according to the API schedule. Heating was carried out, and temperature, pressure and consistency (DC voltage) were measured at 2 minute intervals during the heat up schedule and at 10 minute intervals thereafter. The test was carried out until the upper test temperature (the test temperature listed in Table 2, below) was reached and terminated when the, DC voltage reached the point corresponding to 100 Bearden Units (Bc).

Free Water Test

A slurry, prepared according to the above procedures, was poured into the prelubricated (silicon grease) cup of the consistometer. The slurry was heated to the test temperature, poured into a graduated cylinder, clamped at a 45 degree angle, and allowed to set for 2 hours. The amount of water rising to the top of the cement column was recorded as the free water.

TABLE 2

| | Results Of API Cement Test | | | | | | | | | |
|---|---|---|---|---|---|---|---|---|---|---|
| | Initial Consistency Bc$^b$ (g) | | Fluid Loss (ml) | | | Thickening (Set) Time$^c$ | | Free Water | | |
| Polymers$^a$ | 0 min. | 60 min. | 140° F. | 200° F. | 225° F. | 140° F. | 200° F. | 140° F. | 200° F. | 200° F. |
| 1. Control 1 - 100% HEC 1 | — | 7 | 174 | 225 | 154$^d$ | — | 6.3 hrs. | 18 cc | 20 cc | — |
| 2. Control 2 - 100% HEC 2 | — | 10 | 85 | 188 | 86$^d$ | — | 5.6 hrs. | 20 cc | 18 cc | (5.0%) |
| 3. Control 3 - 100% HEC 3 | 8 | 9 | — | 92 | — | — | — | — | 9 cc | (2.5%) |
| 4. 80% HEC 4 - 20% HMHEC 1 | — | 8 | 68 | 64 | 54$^d$ | >8.0 hrs. | 5.6 hrs. | 22 cc | 15 cc | (4.2%) |
| 5. 67% HEC 4 - 33% HMHEC 1 | — | 9 | 22 | 28 | 38$^d$ | >8.0 hrs. | 5.8 hrs. | 12 cc | 14 cc | (3.9%) |
| 6. 33% HEC 3 - 67% HMHEC 2 | 18 | 17 | — | 36 | — | — | — | — | 6 cc | (1.7%) |
| 7. 100% HMHEC 2 | 28 | 20 | — | 30 | — | — | — | — | 4 cc | (1.1%) |

$^a$Concentrations used: 0.325% polymer, 0.325% Lomar D, and 42% water, based on weight of cement.
$^b$Measured at room temperature.
$^c$Time to reach 100 Bc.
$^d$Fluid loss result which may be artificially low due to settling during the fluid loss test.

The above data show that HMHEC either alone (Sample 7) or in combination with HEC (Samples 4 through 6) provides fluid loss control in shallow, intermediate and deep well formations (the API defines wells by temperature: shallow = <140° F.; intermediate =140°-200° F.; and deep =>200° F.). In addition, it shows that HMHEC alone, or in combination with HEC, provides better fluid loss properties than HEC alone (Samples 1 through 3).

The above data show that cement initial consistency is higher with HMHEC (Sample 7) than HEC (Samples 1 through 3). The usual acceptable consistency range based on the pump-ability of cement is 5 to 30 Bearden units (Bc), preferably 10 to 12 Bc. The initial consistency of HMHEC (Sample 7) is acceptable at 28 Bc. However, use of HMHEC/HEC blends (Samples 4 through 6) appears preferable as they provide better initial consistency than HMHEC alone.

Free water volumes are better with HMHEC (Sample 7) than with HEC (Samples 1 through 3) or HEC/HMHEC blends (Samples 4 through 6).

While this invention has been described with respect to specific embodiments, it should be understood that these embodiments are not intended to be limiting and that many variations and modifications are possible without departing from the scope of this invention.

We claim:

1. A composition of matter comprising, (a) from about 1 to about 99% water-soluble, monionic hydroxyethyl cellulose and (b) from about 99 to about 1% water-soluble, nonionic hydrophobically modified bydroxyethyl cellulose, based on the total dry weight of (a) the water-soluble, nonionic hydrophobically modified hydroxyethyl cellulose and (b) the water-soluble, nonionic hydroxyethyl cellulose, wherein the hydrophobic modifier of the water-soluble, nonionic hydrophobically modified hydroxyethyl cellulose is a long chain alkyl group attached to the cellulose in an amount of from about 0.2 to about 4%, by weight of the fully substituted water-soluble, nonionic hydrophobically modified hydroxyethyl cellulose.

2. The composition of claim 1 containing (a) from about 30 to about 70% of the water-soluble, nonionic hydroxyethyl cellulose and (b) from about 70 to about 30% of the water-soluble, nonionic hydrophobically modified hydroxyethyl cellulose.

3. The composition of claim 1 wherein the water-soluble, nonionic hydrophobically modified hydroxyethyl cellulose has a hydroxyethyl M.S. of at least about 1.5 and the long chain alkyl group is attached to the cellulose via an ether or ester linkage.

4. The composition of claim 2 wherein the water-soluble, nonionic hydrophobically modified hydroxyethyl cellulose has a hydroxyethyl M.S. of at least about 1.5 and the long chain alkyl group is attached to the cellulose via an ether or ester linkage.

5. The composition of claim 1 wherein the hydrophobic modifier of the water-soluble, nonionic hydrophobically modified hydroxyethyl cellulose is a n-alkyl radical having 6 to 25 carbon atoms attached to the cellulose in an amount of from about 0.2 to about 1.5%, be weight of the fully substituted water-soluble, nonionic hydrophobically modified hydroxyethyl cellulose.

6. The composition of claim 2 wherein the hydrophobic modifier of the water-soluble, nonionic hydrophobically modified hydroxyethyl cellulose is a n-alkyl radical having 6 to 25 carbon atoms attached to the cellulose in an amount of from about 0.2 to about 1.5%, by weight of the fully substituted water-soluble, nonionic hydrophobically modified hydroxyethyl cellulose.

7. The composition of claim 4 wherein the hydrophobic modifier of the water-soluble, nonionic hydrophobically modified hydroxyethyl cellulose is a n-alkyl radical having 6 to 25 carbon atoms attached to the cellulose in an amount of from about 0.2 to about 1.5%, by weight of the fully substituted water-soluble, nonionic hydrophobically modified hydroxyethyl cellulose.

8. The composition of claim 1 wherein the hydrophobic modifier of the water-soluble, nonionic hydrophobically modified hydroxyethyl cellulose is a n-alkyl radical having 8 to 18 carbon atoms attached to the cellulose in an amount of from about 0.2 to about 1.0%, by weight of the fully substituted water-soluble, nonionic hydrophobically modified hydroxyethyl cellulose, 9. The composition of claim 2 wherein the hydrophobic modifier of the water-soluble, nonionic hydrophobically modified hydroxyethyl cellulose is a n-alkyl radical having 8 to 18 carbon atoms attached to the cellulose in an amount of from about 0.2 to about 1.0%, by weight of the fully substituted water-soluble, nonionic hydrophobically modified hydroxyethyl cellulose.

10. The composition of claim 3 wherein the hydrophobic modifier of the water-soluble, nonionic hydrophobically modified hydroxyethyl cellulose is a n-alkyl radical having 8 to 18 carbon atoms attached to the cellulose in an amount of from about 0.2 to about 1.0%, by weight of the fully substituted water-soluble, nonionic hydrophobically modified hydroxyethyl cellulose.

11. The composition of claim 4 wherein the hydrophobic modifier of the water-soluble, nonionic hydrophobically modified hydroxyethyl cellulose is a n-alkyl radical having 8 to 18 carbon atoms attached to the cellulose in an amount of from about 0.2 to about 1.0%, by weight of the fully substituted water-soluble, nonionic hydrophobically modified hydroxyethyl cellulose.

12. The composition of claim 1 wherein the water-soluble, nonionic hydrophobically modified hydroxyethyl cellulose has a hydroxyethyl M.S. of at least about 1.5 and the hydroxyethyl cellulose has a hydroxyethyl M.S. of at least about 0.5.

13. The composition of claim 1 wherein the water-soluble, nonionic hydrophobically modified hydroxyethyl cellulose has a hydroxyethyl M.S. of about 1.5 to about 4.0 and the water-soluble, nonionic hydroxyethyl cellulose has a hydroxyethyl M.S. of from about 1.0 to about 2.5.

14. The composition of claim 2 wherein the water-soluble, nonionic hydrophobically modified hydroxyethyl cellulose has a hydroxyethyl M.S. of about 1.5 to about 4.0 and the water-soluble, nonionic hydroxyethyl cellulose has a hydroxyethyl M.S. of from about 1.0 to about 2.5.

15. The composition of claim 7 wherein the water-soluble, nonionic hydrophobically modified hydroxyethyl cellulose has a hydroxyethyl M.S. of about 1.5 to about 4.0 and the water-soluble, nonionic hydroxyethyl cellulose has a hydroxyethyl M.S. of from about 1.0 to about 2.5.

16. The composition of claim 11 wherein the water-soluble, nonionic hydrophobically modified hydroxyethyl cellulose has a hydroxyethyl M.S. of about 1.5 to about 4.0 and the water-soluble, nonionic hydroxyethyl cellulose has a hydroxyethyl M.S. of from about 1.0 to about 2.5.

17. The composition of claim 1 wherein the water-soluble, nonionic hydrophobically modified hydroxyethyl cellulose has a Brookfield viscosity in the range of about 300 to about 500 cps in a 1% aqueous solution at ambient temperature and the hydroxyethyl cellulose has a Brookfield viscosity in the range of about 25 to about 250 cps in a 5% aqueous solution at ambient temperature.

18. The composition of claim 2 wherein the water-soluble, nonionic hydrophobically modified hydroxyethyl cellulose has a Brookfield viscosity in the range of about 300 to about 500 cps in a 1% aqueous solution at ambient temperature and the hydroxyethyl cellulose has a Brookfield viscosity in the range of about 25 to about 250 cps in a 5% aqueous solution at ambient temperature.

19. The composition of claim 7 wherein the water-soluble, nonionic hydrophobically modified hydroxyethyl cellulose has a Brookfield viscosity in the range of about 300 to about 500 cps in a 1% aqueous solution at ambient temperature and the hydroxyethyl cellulose has a Brookfield viscosity in the range of about 25 to about 250 cps in a 5% aqueous solution at ambient temperature.

20. The composition of claim 17 wherein the water-soluble, nonionic hydrophobically modified hydroxyethyl cellulose has a Brookfield viscosity in the range of about 300 to about 500 cps in a 1% aqueous solution at ambient temperature and the hydroxyethyl cellulose has a Brookfield viscosity in the range of about 25 to about 250 cps in a 5% aqueous solution at ambient temperature.

* * * * *

UNITED STATES PATENT AND TRADEMARK OFFICE
CERTIFICATE OF CORRECTION

PATENT NO. : 4,892,589

DATED : JANUARY 9, 1990

INVENTOR(S) : KIRKLAND, LUKACH & McLACHLAN

It is certified that error appears in the above-identified patent and that said Letters Patent is hereby corrected as shown below:

Column 6, line 16;

" $Q_+=Q_t X 10.954//t$ "  should read  -- $Q_{30}=Q_t \times 10.954/t$ -- .

Column 7, Claim 5, line 59;

" be "  should read  -- by -- .

Signed and Sealed this

Eleventh Day of June, 1991

Attest:

HARRY F. MANBECK, JR.

Attesting Officer

Commissioner of Patents and Trademarks